(12) United States Patent
Schumacher et al.

(10) Patent No.: US 7,973,426 B2
(45) Date of Patent: Jul. 5, 2011

(54) PERSONAL PROTECTION CONTROL UNIT

(75) Inventors: Hartmut Schumacher, Freiberg (DE); Jens Wirth, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 11/992,260

(22) PCT Filed: Sep. 7, 2006

(86) PCT No.: PCT/EP2006/066104
§ 371 (c)(1),
(2), (4) Date: Apr. 21, 2009

(87) PCT Pub. No.: WO2007/033907
PCT Pub. Date: Mar. 29, 2007

(65) Prior Publication Data
US 2009/0206656 A1   Aug. 20, 2009

(30) Foreign Application Priority Data
Sep. 22, 2005  (DE) .......................... 10 2005 045 233

(51) Int. Cl.
*H02J 1/10*     (2006.01)

(52) U.S. Cl. .............................. 307/43; 307/9.1; 307/66

(58) Field of Classification Search .................... 307/9.1, 307/10.1, 43, 64, 66
See application file for complete search history.

(56) References Cited

U.S. PATENT DOCUMENTS
2005/0155509 A1 *   7/2005   Matsuda et al. ........... 102/202.9

FOREIGN PATENT DOCUMENTS
| DE | 43 13 124 | 10/1994 |
| DE | 195 05 334 | 8/1996 |
| DE | 10 2004 010135 | 9/2004 |
| EP | 1 204 544 | 12/2001 |
| WO | WO 91/00636 | 1/1991 |
| WO | WO 2004/006422 | 1/2004 |
| WO | WO 2005/035317 | 4/2005 |

* cited by examiner

*Primary Examiner* — Jared J Fureman
*Assistant Examiner* — Carlos Amaya
(74) *Attorney, Agent, or Firm* — Kenyon & Kenyon LLP

(57) ABSTRACT

A personal protection control unit, having an energy reserve which is charged by a battery voltage and supplies power to the control unit. In addition, a first voltage supply circuit is provided, down-converting the voltage of the reserve power in such a way that the first voltage supply circuit supplies several voltage levels for operation of the control unit. Finally, a second voltage supply circuit is also provided and is also connected to the energy reserve, supplying at least one additional voltage level to at least one transistor and to at least one voltage regulator via a resistive circuit.

7 Claims, 1 Drawing Sheet

PERSONAL PROTECTION CONTROL UNIT

BACKGROUND INFORMATION

It is known from European Patent No. EP 1 204 544 that a power storage may be provided in a vehicle for activation of restraint devices, providing the restraint devices with power even when there is an interruption in electric power supply, so their deployment may be ensured. An electrolytic capacitor is frequently used for this purpose.

SUMMARY OF THE INVENTION

The personal protection control unit according to the present invention has the advantage over the related art that two voltage supply circuits are provided, a first voltage supply circuit down-converting a voltage of the reserve power and supplying several predefined voltage levels. The second voltage supply circuit has a simpler design than the first voltage supply circuit and has a resistive circuit, a transistor and a voltage regulator and supplies at least one additional voltage level. It is thus possible to support the efficiency of the first voltage supply circuit with respect to the convertability by the second voltage supply circuit. Power consumption by such a personal protection system is becoming ever greater due to the increasing complexity of personal protection systems because of the growing number of external sensors, such as side impact sensors or upfront sensors or pedestrian protection sensors or even surroundings sensors. This power consumption may be too much for a voltage supply circuit having a step-down transformer or may burden it to the limits. It is therefore provided according to the present invention that a second voltage supply circuit be provided, having a simpler design than the first voltage supply circuit and supplying at least one additional voltage level.

It is advantageous in particular that the first voltage supply circuit supplies an ignition voltage and at least three different voltage levels as the predefined voltage levels. The different voltage levels are necessary due to the different electronic modules installed in the control unit.

The voltage regulator is advantageously designed as a two-point voltage regulator. This means that when the voltage regulator detects that the voltage has dropped below a predefined voltage value in the voltage level to be supplied, the voltage regulator responds in such a way that the voltage level is increased again. This may be accomplished by influencing the transistor or by adding a parallel resistor or by other methods known from circuit technology. If the measured level exceeds another predefined threshold value, the voltage regulator is switched off, so the voltage can drop again. These two threshold values are different, so there are two points, hence the term two-point regulator.

It is also advantageous that the second voltage supply circuit is connected to at least one external sensor in such a way that that the second voltage supply circuit supplies the additional voltage level to the at least one external sensor. Thus components that may be different for each vehicle platform are allocated to the second voltage supply circuit, depending on how many external sensors, i.e., acceleration sensors, pressure sensors, temperature sensors or surroundings sensors or contact sensors are connected. However, it is also possible for the second voltage supply circuit to be provided instead or additionally to supply internal components.

In a refinement, the voltage regulator is connected to a processor, so that the processor is able to control the voltage regulator. This control may be, for example, a simple turn-on or turn-off to turn the voltage regulator on or off. However, it is also possible for the microcontroller as a processor to perform a voltage measurement itself via its analog-digital converter, so that then regulation is achieved because the regulator is influenced as a function of the measured value of the analog-digital converter.

In an advantageous embodiment of the control unit according to the present invention, the voltage regulator is connected to the resistive circuit in such a way that the voltage regulator is able to measure a voltage drop across the resistive circuit and trigger the resistor as a function of this measurement. Triggering may be accomplished gradually by controlling the resistance of the transistor, or it may also be turned on or turned off.

It is also possible for the processor of the control unit to be connected to the regulating circuit in such a way that the processor measures the output voltage for the external sensors via its analog-digital converter and influences the regulating circuit as a function thereof, namely the second voltage supply circuit. A voltage divider may also be provided to connect the output voltage to the analog-digital converter.

DETAILED DESCRIPTION

Figure 1:
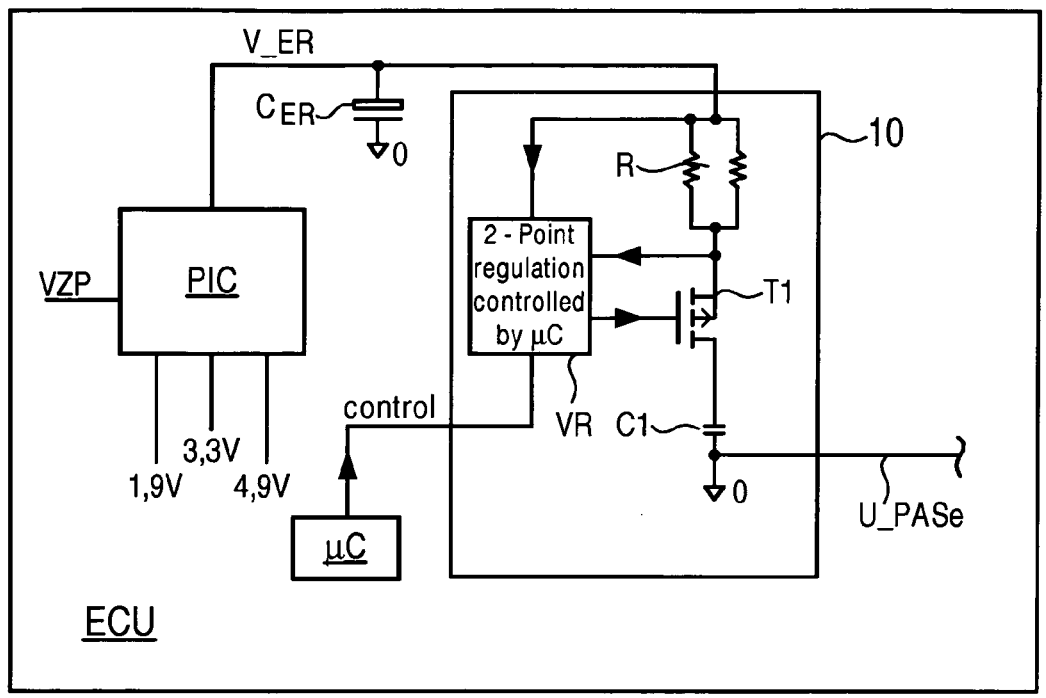
FIG. 1 shows a first schematic diagram of the control unit according to the present invention.

FIG. 1 shows the control unit according to the present invention in a first schematic diagram. This shows only the parts important for an understanding of the present invention. An actual control unit has many more components. Control unit ECU has an energy reserve capacitor $C_{ER}$. This capacitor $C_{ER}$ is charged by the battery voltage of the motor vehicle, e.g., to a voltage of approximately 35 volt, via a converter circuit (not shown here). Voltage $V_{ER}$ thus prevails. The power in the capacitor may be used either only in the autarkic case, i.e., an interruption in the battery voltage, or continuously to supply power to control unit ECU for personal protection. Instead of an energy reserve capacitor $C_{ER}$, a plurality of capacitors is also possible. Alternatively, however, other power storages such as a fuel cell are also possible. Reserve power capacitor $C_{ER}$ is connected on the first side to first voltage supply circuit PIC and second voltage supply circuit 10. On the other side, reserve power capacitor $C_{ER}$ is connected to ground.

First voltage supply circuit PIC is an integrated circuit which also has other functions. However, only the functions pertaining to the power supply are relevant here. Voltage supply circuit PIC steps down the voltage of reserve power capacitor $C_{ER}$ and supplies the following voltage: voltage VZP and voltage levels 1.9 volt, 3.3 volt and 4.9 volt, which are required for the electronics of the control unit. It is additionally possible for external components that are connected to control unit ECU to also be supplied via voltage supply circuit PIC. Reserve power capacitor $C_{ER}$ is connected to second voltage supply circuit 10, as indicated above. Reserve power capacitor $C_{ER}$ is connected to a resistive circuit R and a first measurement input of a two-point voltage regulator VR. Resistive circuit R may be a single resistor or a resistance network. On the other side, the resistive circuit is connected first to a second measurement input of two-point regulator VR and, second, to a first input terminal of a transistor T1, namely here the source of a field effect transistor. Voltage regulator VR is connected to the gate of transistor T1 via a control input. The drain of transistor T1 is connected to a voltage output U_PASe and a buffer capacitor C1, which is connected to ground on its other side. Voltage regulator VR is connected to microcontroller μC via a control input. Control unit ECU is located centrally in the vehicle on the vehicle tunnel. This is the site that is the last to be damaged in the event of an accident. It is possible to provide control unit ECU at another installation location in the event of a fully separated acceleration sensor. The acceleration sensor provided previously in control unit ECU would then be located only on the tunnel. As described above, control unit ECU is connected to a plurality of external sensors, usually acceleration sensors or structure-borne sound sensors or pressure sensors or temperature sensors or surroundings sensors or any other type of sensors. These sensors are supplied with power via control unit ECU, usually also over a line over which the data from the sensors are transmitted to control unit ECU.

As described above, first voltage supply circuit PIC supplies the four levels, which alternatively may also be more or fewer levels. Second voltage supply circuit 10 has a current source due to the series connection of resistive circuit R and transistor T1. Two-point regulator VR measures the voltage across resistive circuit R, transistor T1 being influenced as a function of this measurement. This influence occurs, for example, due to the change in the source-drain resistance. Microcontroller μC may also have an influence on two-point regulator VR through a measurement (not depicted here) of the supplied voltage level, e.g., by turning voltage regulator VR on or off. Capacitor C1 buffers the supplied voltage. The sensors are then connected to line U_PASe, e.g., as a quasi-bus.

Figure 2:
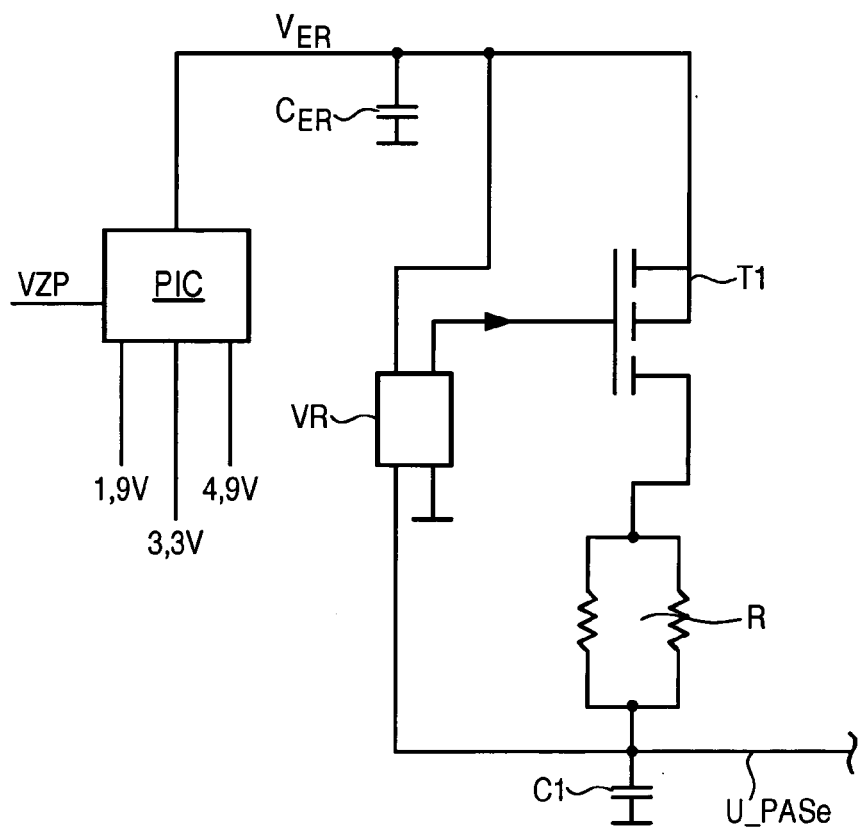
FIG. 2 shows a second schematic diagram.

FIG. 2 shows an alternative circuit of the control unit according to the present invention. Reserve power capacitor $C_{ER}$ is again connected to ground on one side and connected on the other side to first voltage supply circuit PIC, to a component of the second voltage supply circuit and to the voltage regulator itself, which is also connected to ground. Voltage regulator VR is in turn connected to the gate of transistor T1 so as to have an influence on transistor T1. Voltage regulator VR is in turn connected to output voltage U_PASe via a measurement input to measure and regulate the latter accordingly. Resistor R is connected to the drain of transistor T1 and also to output U_PASe to limit the current into capacitor C1 and on the other hand is connected to capacitor C1, which is connected to ground on its other side. In the present case there is no longer a current source but instead this is a simple on-off circuit for the voltage on line U_PASe. Alternatively, the control and/or regulating input for voltage regulator VR has been omitted here because this may also be provided autarkically.

What is claimed is:

1. A personal protection control unit, comprising:
    an energy reserve which is charged by a battery voltage and which supplies power to the control unit;
    a first voltage supply circuit that steps down a voltage of the energy reserve in such a way that the first voltage supply circuit supplies multiple predefined voltage levels for operation of the control unit; and
    a second voltage supply circuit which is connected to the energy reserve and which supplies at least one additional voltage level via a resistive circuit to at least one transistor and a voltage regulator.

2. The control unit according to claim 1, wherein the first voltage supply circuit supplies an ignition voltage and at least three different voltage levels.

3. The control unit according to claim 1, wherein the voltage regulator is a two-point voltage regulator.

4. The control unit according to claim 1, wherein the second voltage supply circuit is connected to at least one external sensor in such a way that the second voltage supply circuit supplies the at least one additional voltage level to the at least one external sensor.

5. The control unit according to claim 1, wherein the voltage regulator is connected to a processor in such a way that the processor is able to control the voltage regulator.

6. The control unit according to claim 5, wherein the processor is connected to the second voltage supply circuit in such a way that the processor measures the at least one additional voltage level.

7. The control unit according to claim 1, wherein the voltage regulator is connected to the resistive circuit in such a way that the voltage regulator measures the at least one additional voltage level and triggers the transistor as a function of the measurement.

* * * * *